US011935075B2

(12) United States Patent
Singh et al.

(10) Patent No.: US 11,935,075 B2
(45) Date of Patent: Mar. 19, 2024

(54) CARD INACTIVITY MODELING

(71) Applicant: MASTERCARD INTERNATIONAL INCORPORATED, Purchase, NY (US)

(72) Inventors: Akash Singh, Delhi (IN); Tanmoy Bhowmik, Bangalore (IN); Deepak Bhatt, Dehradun (IN); Shiv Markam, Mandla (IN); Ganesh Nagendra Prasad, West New York, NJ (US); Jessica Peretta, Purchase, NY (US)

( * ) Notice: Subject to any disclaimer, the term of this patent is extended or adjusted under 35 U.S.C. 154(b) by 280 days.

(21) Appl. No.: 17/398,387

(22) Filed: Aug. 10, 2021

(65) Prior Publication Data

US 2022/0051269 A1     Feb. 17, 2022

(30) Foreign Application Priority Data

Aug. 13, 2020    (IN) .............................. 202011034927

(51) Int. Cl.
  *G06Q 30/0201*     (2023.01)
  *G06F 18/2415*    (2023.01)
  *G06N 20/00*     (2019.01)

(52) U.S. Cl.
  CPC ..... *G06Q 30/0201* (2013.01); *G06F 18/2415* (2023.01); *G06N 20/00* (2019.01)

(58) Field of Classification Search
  CPC ............ G06Q 30/0201; G06F 18/2415; G06F 18/2413; G06N 20/00; G06N 3/04; G06N 5/01; G06N 20/20
  See application file for complete search history.

(56) References Cited

U.S. PATENT DOCUMENTS

| 11,574,361 | B2 * | 2/2023 | Rao ..................... G06Q 40/125 |
| 2005/0097028 | A1 * | 5/2005 | Watanabe ............. G06Q 40/02 705/37 |
| 2016/0203509 | A1 * | 7/2016 | Sharp, III .......... G06Q 30/0244 705/14.43 |
| 2020/0019974 | A1 * | 1/2020 | Bene .................. G06Q 30/0202 |

FOREIGN PATENT DOCUMENTS

EP            1625543 A4 *  3/2008  ............. G06Q 10/10

* cited by examiner

*Primary Examiner* — Dylan C White
(74) *Attorney, Agent, or Firm* — Pillsbury Winthrop Shaw Pittman LLP

(57) ABSTRACT

Systems and computer-implemented methods are described for modeling card inactivity. For example, hierarchical modeling may be used in which a first level classifier may be trained and validated to predict whether a card will be inactive. For cards predicted to become inactive by the first level classifier, a second level classifier may be trained and validated to predict when the card will become inactive. The first level classifier may include a binary classifier that generates two probabilities that respectively predict that the card will and will not become inactive. The second level classifier may include a multi-class classifier that generates a first probability that the card will become inactive at a first time period (such as one or more months in the future) and a second probability that the card will become inactive at a second time period. The multi-class classifier may generate other probabilities corresponding to other time periods.

20 Claims, 17 Drawing Sheets

CARD INACTIVITY MODELING

RELATED APPLICATIONS

This application claims priority to Indian Provisional Patent Application No. 202011034927, filed Aug. 13, 2020, which is incorporated herein by reference in its entirety.

BACKGROUND

Machine-learning (ML) approaches may be able to provide insights on large-scale data for classification tasks. Generally speaking, classification may involve computer modeling that learns relationships between features from training data and target values corresponding to classifications. Such computer modeling may then classify an input dataset into one of the classifications based on the learned relationships. However, the foregoing may require low variability between training data and the validation dataset and/or other requirements. Oftentimes, these requirements are not met, rendering ML-based classification tasks inaccurate.

An example in which data may exhibit high variability includes account activity. In particular, card activity for payments may vary over time, which may make predictions on when inactivity occurs difficult. Addressing card inactivity may be important for credit card companies and banks, which earn revenue based on payment transactions. In addition to the problem that data variability presents to ML solutions, the scale of transactions per year (in excess of billions of transactions) and number of cards globally (in excess of billions), predicting card inactivity presents difficulties in scalability. These and other issues may exist for using ML approaches to predict card inactivity.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
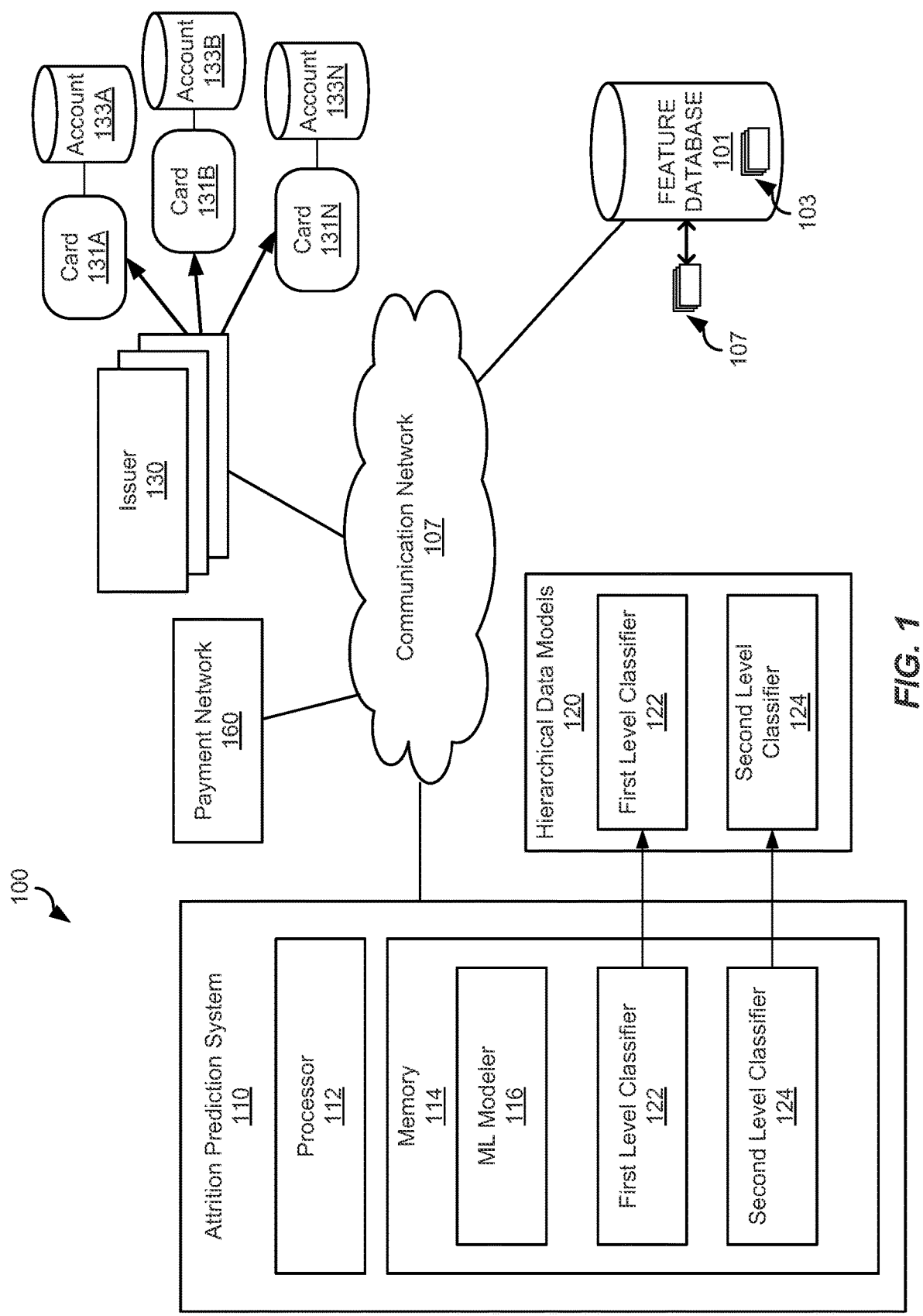
FIG. 1 illustrates an example of a system of data modeling, which may include hierarchical data modeling, to predict whether and/or when usage attrition will occur.

The disclosure herein relates to methods and systems of data modeling that addresses variability of account inactivity data over time and other technical issues of machine-learning (ML) classification tasks relating to attrition. The term "attrition" as used herein may refer to usage inactivity for an amount of time, which may be predefined such as 120 days or other amount of time. "Inactivity" may refer to periods in which usage activity is not observed. For purposes of illustration, in the examples that follow, ML modeling may be described with reference to modeling attrition in the context of payment account usage. In these examples, payment account inactivity may refer to an account (and more particularly a card such as a payment card of the payment account) not being used for a payment transaction in a given period of time.

However, the disclosure may relate to training, validating, and using an ML classifier in the context of modeling attrition in the context of other types of inactivity that may vary over time, which may reduce the accuracy or efficiency of ML classification tasks. For example, the attrition modeling described herein may be used in the context of electronic-commerce sites or loyalty programs that have access to transaction data of its customers, on-demand multi-media services that have access to usage activity, and/or other types of contexts in which it may be desirable to predict and prevent usage inactivity. For example, customer retention is an important activity for many companies since acquiring a new customer may be an order of magnitude as costly as retaining a current customer. Losing current customers is an important business metric for many organizations including banks, telecom operators, insurance firms. For online businesses like music streaming and news portals, attrition will oftentimes result in a paying customer becoming a free user of the services.

In some examples, the ML modeling described herein may include training, validating, and using a first level classifier that determines whether a given account will or will not attrite within a prediction period. For example, the first level classifier may include a binary classifier that classifies an account as either will attrite or will not attrite. In some examples, the first level classifier may include a one-class classifier that is trained and validated only on data from accounts that have attrited.

In some examples, the ML modeling described herein may include training, validating, and using a second level classifier that determines when a given account will attrite. For example, the second level classifier may include a multi-class classifier that, for a given account, outputs a plurality of classifications. Each classification may represent a probability that the given account will attrite at a corresponding time period in the future. For example, a first classification may represent a first probability that the account will attrite in a first month or first group of months, while a second classification may represent a second probability that the account will attrite in a second month or second group of months. Other classifications may be used as well.

In some examples, the ML modeling described herein may include redefining customer inactivity for training and validating two level hierarchical classifiers. For example, the ML modeling described herein may include hierarchical modeling in which the first level classifier and the second level classifier are used together in a hierarchical manner. In these examples, when the first level classifier determines that a given account will exhibit attrition within a prediction period (such as over a nine month or other period of time), the second level classifier may be used to predict when such attrition will start. Put another way, in some examples, the second level classifier may be executed only for accounts that have been predicted to attrite by the first level classifier. On the other hand, the first level classifier may be executed on all accounts for which an attrition prediction is to be made.

The ML modeling described herein may provide entities such as issuers sufficient time to mitigate against predicted inactivity. In particular, by predicting not only whether or not a user will exhibit inactivity, the ML modeling may also predict a time when the inactivity will begin. In this manner, the entities may be able to prioritize and time use of resources on users based on the improved ML modeling. Such improved ML modeling may include, in addition to or as part of the hierarchical modeling, correctly defining the problems through proper label creation based on observations of activity data (which indicates periods of inactivity), building appropriate domain-specific features, performing data pre-processing and validation, and tuning the data for performance improvements. A system architecture may further be deployed to operate at scale to deliver ML classification results.

For example, FIG. 1 illustrates an example of a system 100 of data modeling, which may include hierarchical data modeling, to predict whether and/or when attrition will occur. In particular, the system 100 may predict whether and/or when one or more accounts 133 (illustrated as accounts 133A, 133B, . . . , 133N) will each have a period of inactivity relating to use of a respective card 131 (illustrated as a card 131A, 131B, . . . , 131N) or other payment device. The various system components may refer to attrition as set forth in FIG. 2, which is a schematic diagram 200 illustrating an example of attrition. As previously noted, the term "attrition" may refer to usage inactivity for a predefined amount of time. In particular, attrition may be defined as inactivity of at least an inactivity timeframe 204 during a prediction period 206 after a snapshot date 202. The inactivity timeframe 204 may refer to an amount of time that the account 133 is inactive, such as not having payment transactions. As further illustrated, the unit of time for the prediction period 206 may be months, although other units of time may be used. In some examples, the snapshot date 202 may be selected based on activity data indicating activity within the inactivity timeframe 204 prior to the snapshot date 202. For example, a given card 131 may have been used in a transaction within the past 120 days prior to the snapshot date 202. More particularly, the given card 131 may have been used in a transaction within a month prior to the snapshot date 202. For illustrative purposes, the month immediately prior to the snapshot date 202 may be referred to as Month 0.

A given card 131 (or corresponding account 133) may be determined to attrite, which may refer to exhibiting attrition, within the prediction period 206. For example, the attrition month (or other unit of time) may vary from within from 0-9 in the prediction period 206. To illustrate, the inactivity timeframe 204 may be predefined to be 120 days, the prediction period 206 may be predefined to be nine months, and the snapshot date 202 may be selected to be Mar. 31, 2020. Other amounts of inactivity timeframes 204 and prediction periods 206 may be used instead, and the snapshot date 202 may be selected to be another date. A given card 131 may be used each month from April 2020 ("Month 1") through Jul. 20, 2020 ("Month 4"), after which there is an inactivity for 120 days within nine months after the snapshot date 202. The card 131 may be determined to attrite on Month 4. Put another way, the attrition month is Month 4 in the foregoing example. In another example, a card 131 that last transacted on March 16, is inactive until August and is used in a transaction in August attrites in month 0.

Returning to FIG. 1, system 100 may include, among other things, a features database 101, an attrition prediction system 110, one or more issuers 130, a payment network 160, one or more payees 170, and/or other components. Features database 101 may store features 103 and labels 105. A feature 103 may refer to a data value known about and stored in association with a account 133 (or card 131). A feature 103 may include a value that relates to a factor that impacts account inactivity. Various factors may contribute to account inactivity, such as probable fraud, decline rates, spend trend, change of customer segmentation (e.g. standard card to a premium card), offers run by banks, card age (upgrading to new cards), expiry date, and/or other factors.

A label 105 may refer to a term assigned to an account 133 (or card 131) to denote a classification of the account 133. For binary classifications, there will be two labels: a first label representing a probability that the account 133 will not attrite and a second label representing a probability that the account 133 will attrite. For one class classifications, a single label may be used to indicate attrition. For multi-class classifications a label 105 may relate to a probability that the account 133 will attrite in a corresponding time period.

An issuer 130 may issue a plurality of cards 131 (illustrated as cards 131A,131B, . . . , 131N). Cards 131 may refer to a payment card such as credit cards, debit cards, and other payment devices such as digital wallets associated with a corresponding account 133. Thus, for purposes of examples described herein, use of a card 131 in a payment transaction may include use of any such payment devices that cause a payment from the account 133.

The attrition prediction system 110 may include a processor 112, a memory 114, an ML modeler 116, and/or other components. The processor 112 may be a semiconductor-based microprocessor, a central processing unit (CPU), an application specific integrated circuit (ASIC), a field-programmable gate array (FPGA), and/or other suitable hardware device. Although the prediction system 110 has been depicted as including a single processor 112, it should be understood that the attrition prediction system 110 may include multiple processors, multiple cores, or the like. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals. The ML modeler 116 may be implemented as instructions that program the processor 112. Alternatively or additionally, the ML modeler 116 may be implemented in hardware.

The ML modeler 116 may train a first level classifier 122 and a second level classifier 124 based on features 103 and labels 105. The first level classifier 122 may predict whether or not an account 133 will attrite and the second level classifier 124 may predict when the account 133 will attrite.

Figure 2:
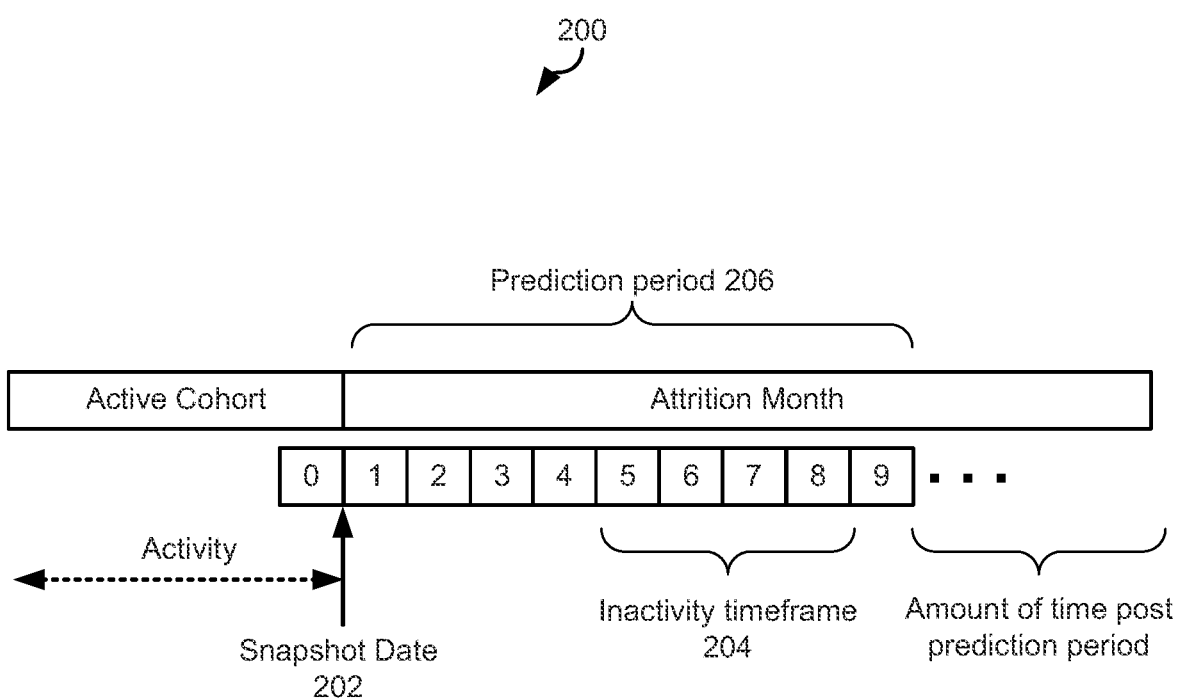
FIG. 2 is a schematic diagram illustrating an example of attrition.

In particular, the first level classifier 122 may generate a binary classification that indicates whether a given account 133 will attrite after a snapshot date 202 (illustrated in FIG. 2) within a prediction period 206 (also illustrated in FIG. 2). For example, the first level classifier 122 may make a prediction that the account 133 will attrite or will not attrite in the next nine months. The second level classifier 124 may generate a plurality of classifications that each indicates a probability that the given account 133 will attrite in a respective month or other unit of time after the snapshot date 202 within the prediction period 206. For example, the second level classifier 124 may generate a first classification that represents a first probability that the account 133 will attrite in a first time period such as a first month, a second classification that represents a second probability that the account 133 will attrite in a second time period such as a second month, and so forth. Based on a particular classification from among the plurality of classifications having the highest probability, a prediction may be made that the account 133 will attrite in the time period associated with the classification associated with the highest probability.

The ML modeler 116 may use ML techniques for modeling such as gradient boosting (in particular examples, Gradient Boosting Machines (GBM), XGBoost, LightGBM, or CatBoost). Gradient boosting is a machine learning technique for regression and classification problems, which produces a prediction model in the form of an ensemble of weak prediction models, typically decision trees. GBM may build a model in a stage-wise fashion and generalizes the model by allowing optimization of an arbitrary differentiable loss function. GBM may operate on categories/sub-categories of features, making it suited for the features 103 described herein. However, other ML techniques may be used as well, such as neural networks. A neural network, such as a recursive neural network, may refer to a computational learning system that uses a network of neurons to translate a data input of one form into a desired output. A neuron may refer to an electronic processing node implemented as a computer function, such as one or more computations. The neurons of the neural network may be arranged into layers. Each neuron of a layer may receive as input a raw value, apply a classifier weight to the raw value, and generate an output via an activation function. The activation function may include a log-sigmoid function, hyperbolic tangent, Heaviside, Gaussian, SoftMax function and/or other types of activation functions.

Figure 3:
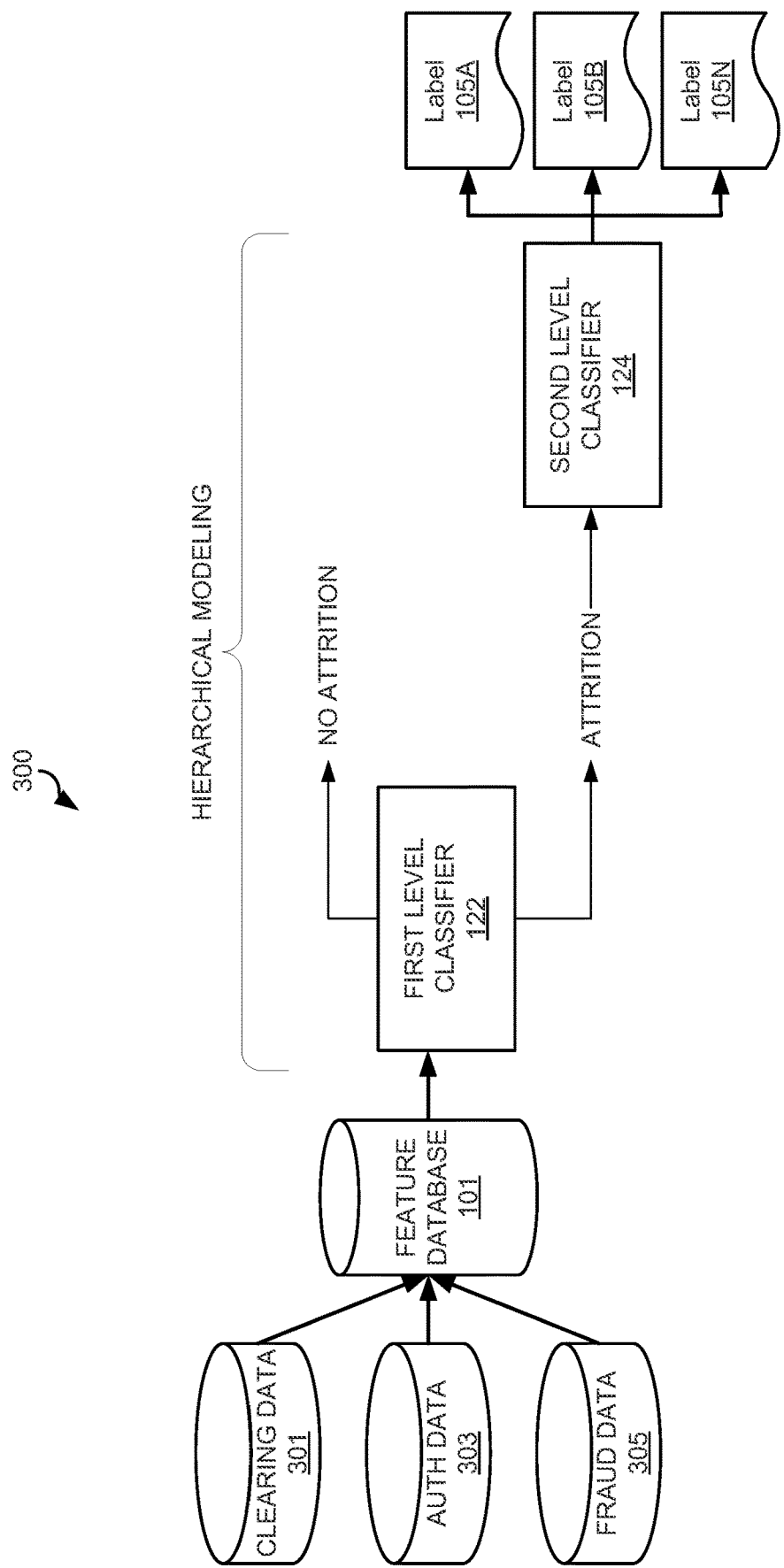
FIG. 3 illustrates an example schematic diagram of hierarchical data modeling.

As will be described with respect to FIG. 3, in some examples, the first level classifier 122 and the second level classifier 124 may be arranged as hierarchical data models 120. FIG. 3 illustrates an example schematic diagram 300 of hierarchical data modeling. In some examples, data from clearing data 301 (which includes data relating to clearing transactions), auth data 303 (which includes authentication data), fraud data 305 (which includes data relating to fraudulent transactions), and/or other source data for features 103 may be stored in association with respect to accounts 133 in the feature database 101. For each account 133, features 103 of the account 133 may be input to the first level classifier 122. The first level classifier 122 may generate a binary classification of the account 133. The binary classification may include a first binary classification indicating no attrition is predicted and a second binary classification indicating that attrition is predicted. In other words, the first level classifier 122 may generate a prediction that the account 133 will or will not attrite within a prediction period 206 (such as within the next nine months). In particular, the first binary classification may represent a first probability that the account 133 will not attrite within the prediction period 206. The second binary classification may represent a second probability that the account 133 will attrite within the prediction period 206. Generally, though not necessarily, the first and second probabilities may sum to a value indicating a 100% probability, although deviations may occur due to error. The determination of whether the account 133 will attrite may be based on a higher one of the first probability or the second probability.

In some examples, when the first level classifier 122 determines that an account 133 will attrite, the features 103 of the account 133 may be input to the second level classifier 124. The second level classifier 124 may generate a multi-class classification of the account 133. The multi-class classification may include a plurality of classifications that each indicate a respective probability that the account 133 will attrite starting on a given time, such as an attrition month. For example, the second level classifier 124 may generate N classifications, where N is a number of labels 105 for multi-class classification. To illustrate, the second level classifier 124 may generate a first classification indicated by a label 105A that represents a first probability that the account 133 will attrite on a first timeframe. The second level classifier 124 may generate a second classification indicated by a label 105B that represents a second probability that the account 133 will attrite on a second timeframe. The second level classifier 124 may generate an Nth classification indicated by a label 105N that represents an Nth probability that the account 133 will attrite on a third timeframe. The second level classifier 124 may generate other numbers of classifications corresponding to the number of labels 105. Generally, though not necessarily, the probabilities of the plurality of classifications may sum to a value indicating a 100% probability, although deviations may occur due to error. The determination of when the account 133 will attrite may be based on a higher one of the generated probabilities.

In some examples, binary, multi-class, and/or hierarchical classification may be performed in real-time as transaction or other features 103 are received by the attrition prediction system 110, such as from the payment network 160. Due to the large quantity of feature data that may flow through at a given time, classifying accounts 133 may be computationally demanding. In some examples, the attrition prediction system 110 may be improved to address these and other technical issues.

Figure 4:
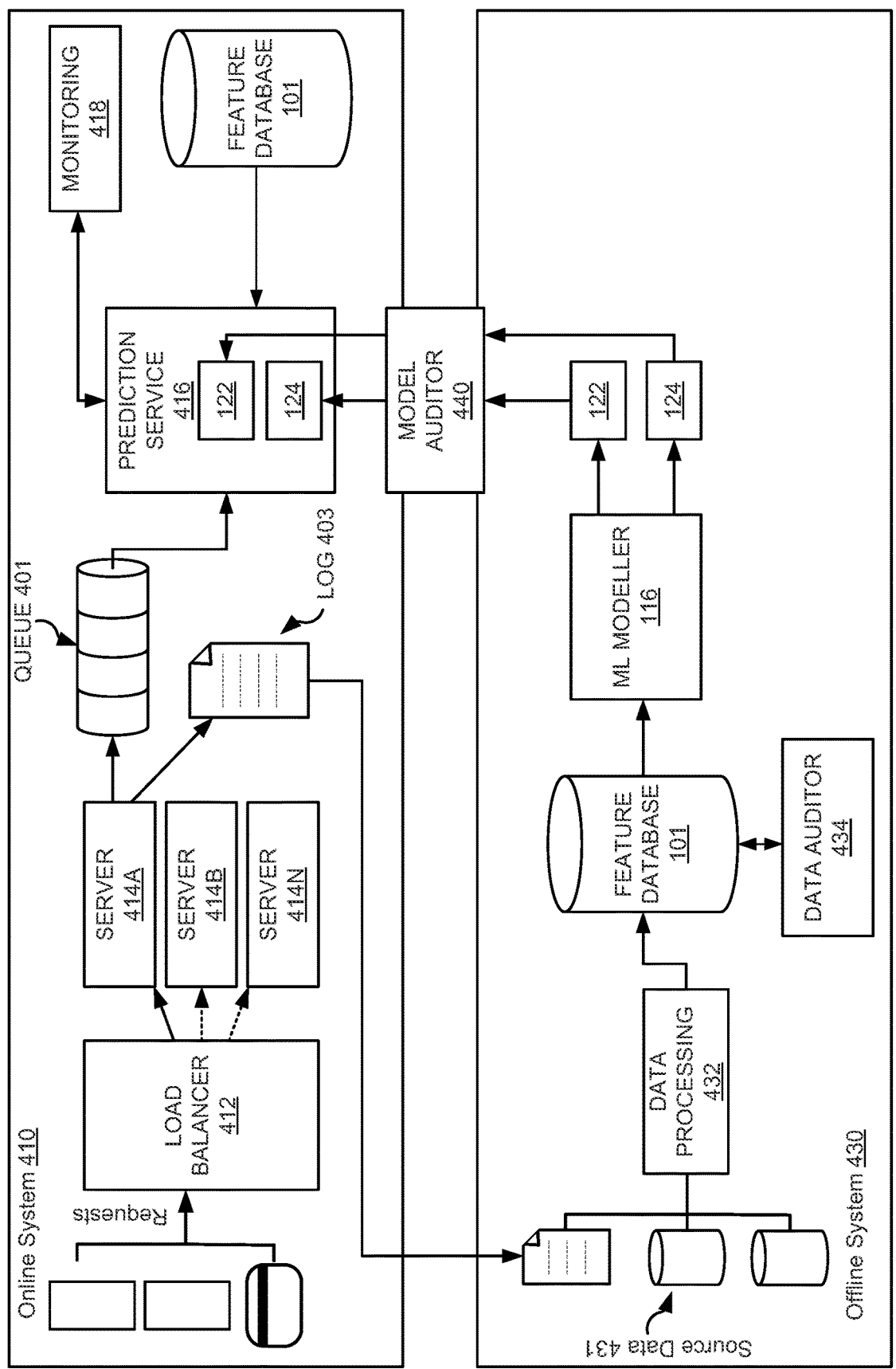
FIG. 4 illustrates an example architecture of an attrition prediction system illustrated in FIG. 1.

For example, FIG. 4 illustrates an example architecture 400 of the attrition prediction system 110 illustrated in FIG. 1. Architecture 400 may include an online system 410 and an offline system 430. The various components illustrated in the architecture 400 may be components of or otherwise be accessible by the attrition prediction system 110. As such, the various components of architecture 400 may be implemented as instructions executed by the processor 112 and/or hardware modules. The online system 410 may process requests to determine whether and/or when accounts 133 will attrite. Each request may include identifying information that identifies the account 133, card 131, and/or other identifying information that identifies an account 133 to be classified. To prevent overwhelming any one server to handle the requests, the online system 410 may route the requests to a load balancer 412. The load balancer 412 may be coupled to and monitor usage loads and/or faults of a plurality of servers 414 (illustrated as server 414A, 414B, . . . , 414N). The load balancer 412 may identify a server 414 that can handle the request based on the usage loads and/or faults to improve scalability and fault tolerance of the online system 410.

Each server 414 may be configured as a webserver or other online computing device that can handle the request. For example, each server 414 may execute a prediction service 416 that includes the first level classifier 122 and the second level classifier 124. In other examples, the prediction service 416 may execute on a central computing device accessible to each server 414. In some examples, to manage requests received from the load balancer 412, each server 414 may maintain a queue 401 (although only one queue 401 is illustrated for convenience). The queue 401 may refer to an ordered storage of requests received from the load balancer 412. In some examples, the queue 401 may include a First-In-First-Out queue in which requests are handled are based on the order in which they are received from the load balancer 412.

Each server 414 may handle a next request in the queue 401. For example, the server 414 may access, from the features database 101, features 103 stored in association with the account 133 identified by the identifying information. In some examples, the server 414 may execute the first level classifier 122 to generate a binary classification of whether the account 133 will attrite. In some examples, the server 414 may execute the second level classifier 124 to generate a plurality of multi-class classifications that indicate when the account 133 will attrite. In some example, the server 414 may perform hierarchical modeling in which the first level classifier 122 is executed to determine whether the account 133 will attrite and, if the account 133 is predicted to attrite, then the second level classifier 124 is executed to determine when the account 133 will attrite. In other words, the server 414 may independently execute the first level classifier 122 and the second level classifier 124 to respectively generate a binary classification or a multi-class classification. Alternatively, the server 414 may execute both the first level classifier 122 and the second level classifier 124 in a hierarchical manner to execute the second level classifier 124 if the first level classifier 122 generates a binary classification that indicates the account 133 will attrite. Once the binary and/or multi-class classification is complete from the prediction service 416, the server 414 may provide results to the requestor. For example, the server 414 may transmit a response (to the request) that includes an indication of the classification of whether (binary) and/or when (multi-class) the account 133 identified in the request will attrite. In some examples, the server 414 may store the results for later retrieval and/or analysis.

In some examples, the server 414 may generate a log 403 that records data relating to the request. For example, the log may include data from the request, the features 103 used to handle the request, the binary classifications, the multi-class classifications, and/or other data relating to the request. In some examples, the online system 410 may include monitoring 418, which may be used to monitor the prediction service 416. As such, monitoring 418 may include one or more interfaces to view telemetry of the prediction service 416.

Figure 5:
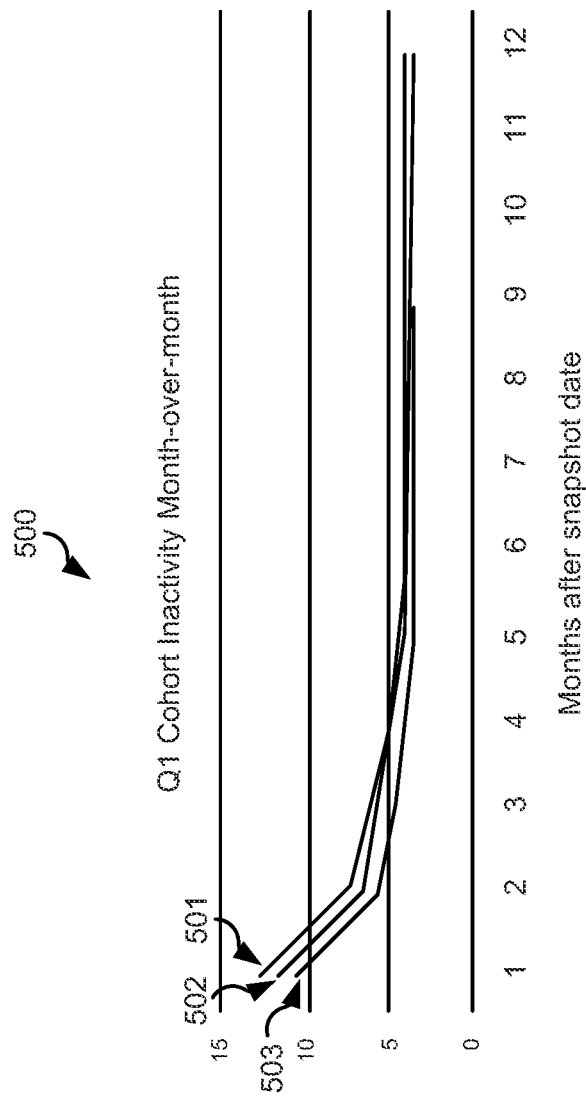
FIG. 5 illustrates an example plot of usage inactivity.
Figure 7:
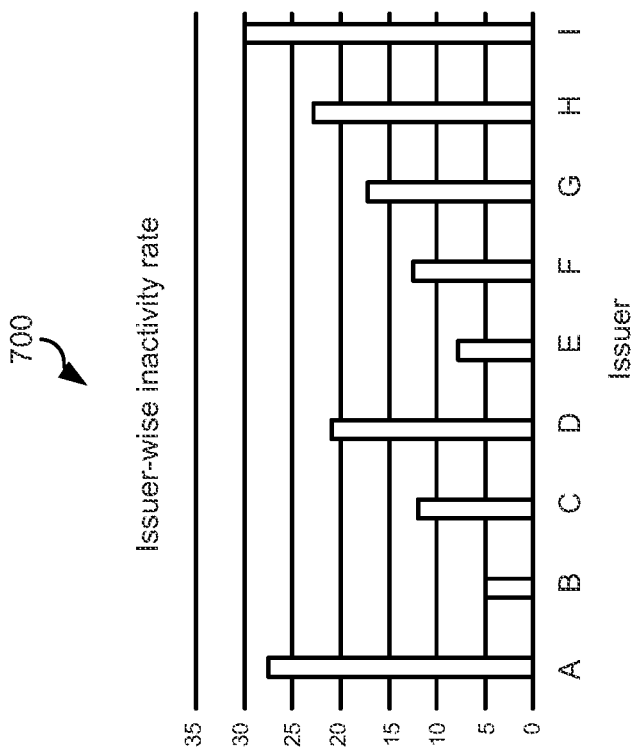
FIG. 7 illustrates an example plot of an observed inactivity rate of accounts per issuer.
Figure 6:
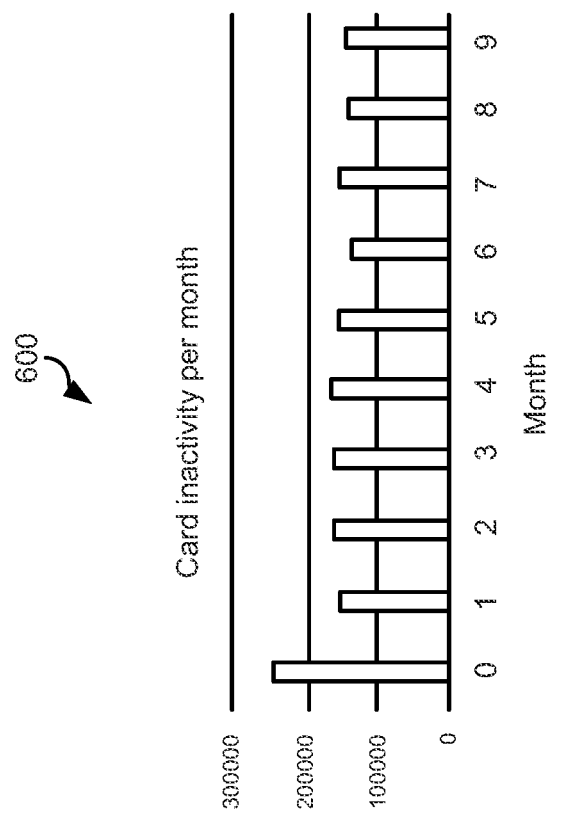
FIG. 6 illustrates an example plot of the number of accounts with usage inactivity observed per month.

The offline system 430 may refer to processing by the attrition prediction system 110 other than processing requests for attrition classifications. For example, the offline system 430 may access source data 431 to perform ML modeling, which may include hierarchical modeling, to train and validate the first level classifier 122 and/or the second level classifier 124. The source data 431 may include transaction data indicating activity and/or other data relating to features 103. Examples of observed inactivity are illustrated by the plots 500-700 respectively illustrated in FIGS. 5-7. For example, FIG. 5 illustrates an example plot 500 of usage inactivity. Lines 501, 502, and 503 represent different years in the available dataset. FIG. 6 illustrates an example plot 600 of the number of accounts with usage inactivity observed per month. FIG. 7 illustrates an example plot 700 of an observed inactivity rate of accounts per issuer. Such usage inactivity may be used to generate labels 105 for classification described herein. In some examples, the source data 431 may include the log 403. In these examples, the first level classifier 122 and the second level classifier 124 may be re-trained or otherwise updated based on the log 403. The source data 431 may be input for data processing 432.

During data processing 432, the offline system 430 may identify features 103 and labels 105 for the ML modeler 116 to train and validate the first level classifier 122 and/or the second level classifier 124. In some examples, during data processing 432, feature reduction and/or refinement to the definition of labels 105 may be performed based on evaluation of models by the model auditor 440, which will be described in more detail below. Feature reduction may improve model performance and/or reduce the amount of data processed by the models, such as the first level classifier 122 and/or the second level classifier 124. Likewise tuning the definition of labels 105 may improve model performance by properly defining the problem space.

Features

In some examples, features 103 may include different categories of features, such as a card-level category, a velocity category, and/or other categories of features. The card-level category of features may refer to features that describe aspects of the account 133 for a card 131. These features 103 may be referred to as card-level features. Examples of card-level features may include product_code, card_type, card_age, last_seen_days, Automatic Billing Update (ABU)-related features such as automatic billing update, expiry date: card expiry date, inactivity features such as counts of 30, 60, 90 days inactivity in past 9 months or other length of time, fraud_indicator, and/or other card-level features.

The velocity category of features may refer to features that describe an occurrence of events with periods of time, such as counts of events in the last 5, 15, 30, 60, 90, 120, 150, 180, 270 days, and so forth. These features 103 may be referred to as velocity features. The velocity features may also include a transaction amount associated with the events. Examples of event counts may include total transaction, card present versus card not present, cross-border versus domestic, transaction type (such as purchase, ATM, cash disbursement, reversal), transactions per super industry, declined transactions, electronic commerce transactions, and/or other event counts. In some examples, the particular set of features 103 used for training may be tuned based on an evaluation of model performance, such as by the model auditor 440.

Figure 8:
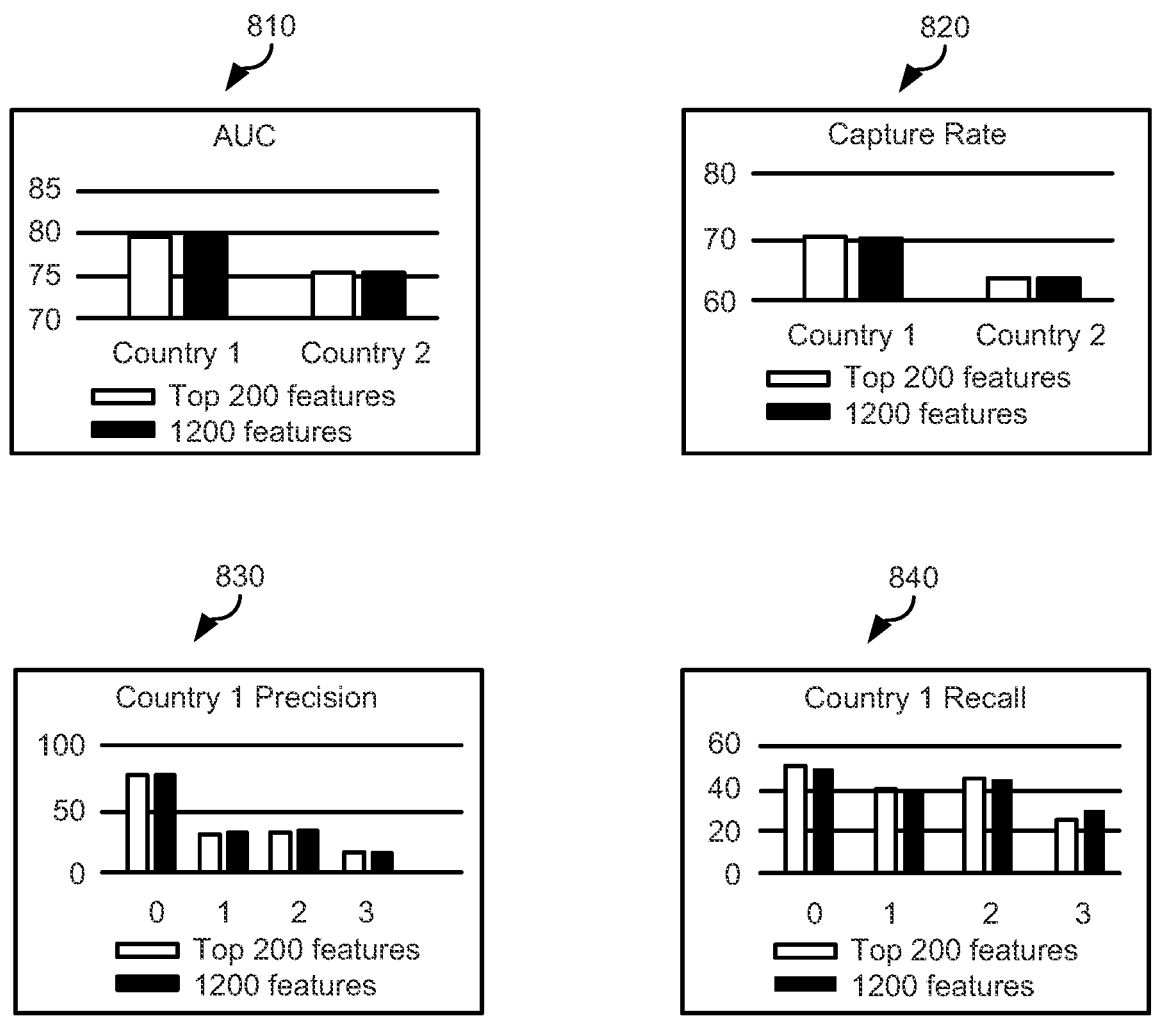
FIG. 8 illustrates example plots of feature reduction results.

In some examples, during data processing 432, feature reduction may be performed to reduce the number of features 103 used for training and validation. For example, different sets of features 103 may be used for training and validation. The model auditor 440 may generate evaluation metrics that indicate performance of the various models trained and validated using the different sets of features 103 to identify a subset of all available features 103 to be used for training and validation. The evaluation metrics may include AUC, capture rate, precision and recall. For example, FIG. 8 illustrates example plots 810, 820, 830, and 840 of the evaluation metrics of the top 200 features selected from 1200 available features.

Plots 810 and 820 each illustrate results for the top 200 features 103 compared to all available features 103 across transactions analyzed in two countries ("Country 1" and "Country 2"). In particular, plot 810 illustrates AUC values. For Country 1, AUC values were 79.7 for top 200 features and 79.7 for 1200 features. For Country 2, AUC values were 75.4 for top 200 features and 75.6 for 1200 features. Plot 820 illustrates capture rates. For Country 1, capture rates were 70.2% for top 200 features and 70.2% for 1200 features. For Country 2, capture rates were 63.5% for top 200 features and 63.6% for 1200 features.

Plots 830 and 840 respectively illustrate precision and recall values for Country 1 across four different labels ("0", "1", "2", "3"). In particular, plot 830 illustrates precision values of 77 and 78 respectively for top 200 features and 1200 features for label 0; 32 and 33 respectively for top 200 features and 1200 features for label 1; 34 and 35 respectively for top 200 features and 1200 features for label 2; and 18 and 17 respectively for top 200 features and 1200 features for label 3. Plot 840 illustrates recall values of 51 and 49 respectively for top 200 features and 1200 features for label 0; 41 and 39 respectively for top 200 features and 1200 features for label 1; 45 and 44 respectively for top 200 features and 1200 features for label 2; and 26 and 30 respectively for top 200 features and 1200 features for label 4.

Labels

In some examples, during data processing 432, labels 105 may be generated based on observations of transaction data that indicates transactions and dates of the transactions made using accounts 133. Such transaction data may therefore indicate account activity and inactivity. For example, a snapshot date 202 may be selected based on activity of accounts 133 up to the snapshot date 202. The usage of accounts 133 may be observed during an observation period, which may start after the snapshot date 202 and end through the prediction period 206 plus the inactivity timeframe 204. For example, activity of accounts 133 during the observation period may be observed to identify periods of inactivity of at least 120 days.

For binary classifications, the classifications may include two classifications indicating whether or not attrition will occur and corresponding two labels 105. In these examples, the labels 105 may include a first binary label (such as "1" or other indication) to indicate attrition and a second binary label (such as "0" or other indication) to indicate no attrition. Features 103 (such as features observed up to the snapshot date 202) may be labeled with a corresponding binary labels (such as "1" or "0") for training the first level classifier 122. An account 133 that is classified into a classification identified by given binary label will be predicted to either attrite or not attrite in the prediction period 206. It should be noted that for one-class classifications, there may exist a single label to denote attrition. In this example, an account 133 may be flagged as likely to attrite when the single label to denote attrition is applied to the account 133.

For multi-class classifications, the classifications may include two or more classifications indicating a start of attrition and corresponding two or more labels 105. In these examples, the labels 105 may include two or more multi-class labels to indicate when attrition begins. In some examples, the multi-class labels may be grouped by one or more attrition months or other time period. In these examples, a first multi-class label may indicate that attrition starts at a first grouping of one or more months. A second multi-class label may indicate that attrition starts at a second grouping of one or more other months. A third multi-class label may indicate that attrition starts at a third grouping of one or more still other months, and so on. The number of multi-class labels used may vary depending on the prediction period 206 and/or the particular grouping of one or more months, as well as model evaluations. In a particular example, a first multi-class label may indicate that the attrition month is Month 0, the second multi-class label may indicate that the attrition month is Months 1-4, a third label may indicate that the attrition month is Months 5-9, and so on. Features 103 (such as features observed up to the snapshot date 202) may be labeled with the corresponding multi-class label for training the second level classifier 124. An account 133 that is classified into a classification identified by given multi-class label will be predicted to attrite in the corresponding one or more months or other time period in the prediction period 206. In the foregoing example, an account 133 classified into a classification corresponding to the second multi-class label is predicted to attrite beginning in any of Months 1-4.

In some examples, the particular number of multi-class labels, grouping of months or other time periods into the multi-class labels, and/or other aspects of the multi-class labels used for training may be tuned based on an evaluation of model performance, such as by the model auditor 440. For example, the month groupings in each label may be adjusted to improve model multi-class classification performance. Such adjustments may improve multi-class classification performance as compared to single-month classes in which a label 105 corresponds to a single month and compared to arbitrary month groupings. To facilitate such improvement, different groupings of months may be assigned for each label and the resulting modeling may be evaluated by the model auditor 440.

Figure 9:
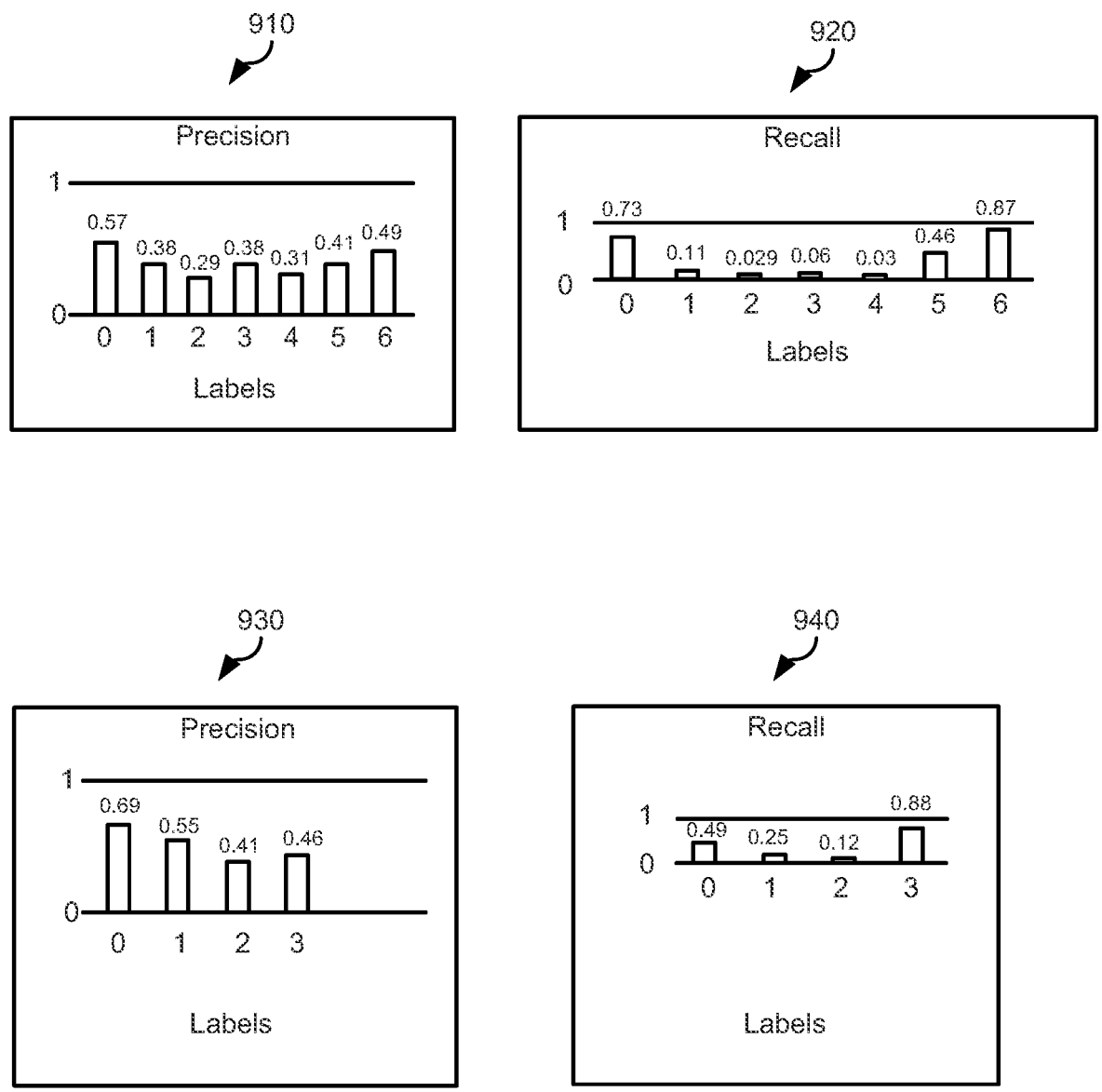
FIG. 9 illustrates example plots of improving multi-class label groupings.

For example, FIG. 9 illustrates example plots 910, 920, 930, and 940 of improving multi-class label groupings. It should be noted that FIG. 9 illustrates certain values as a decimal value, but these may be converted to other scales such as a percentage value. Likewise, other plots illustrated herein may be illustrated as percentage values, which may be converted to other scales such as decimal values. Plots 910 and 920 respectively illustrate evaluation metrics of precision and recall over a prediction period in which seven labels (0-6) are used. Labels 0-4 may each correspond to a single month (where label 0 reflects attrition prediction in month 0, label 1 reflects attrition prediction in month 1, label 2 reflects attrition prediction in month 2, label 3 reflects attrition prediction in month 3, and label 4 reflects attrition prediction in month 4), label 5 reflects attrition prediction in months 5 to 9 (a grouping of five months), and label 6 reflects attrition prediction for month 10. Plots 930 and 940 respectively illustrate evaluation metrics of precision and recall over a prediction period in which four labels (0-4) are used. Label 0 may reflect an attrition prediction in month 0. Label 1 reflects attrition prediction in months 1 to 4 (a grouping of four months), label 2 reflects attrition prediction in months 5 to 9 (a grouping of five months), and label 3 reflects attrition prediction for month 10. These and other evaluations may be generated to select an appropriate grouping of months or other time period for labels 105.

In some examples, features 103 (such as the top 200 or other set of features) may be stored in the feature database 101. Likewise, labels 105 (such as labels 105 that have been tuned) may be stored in the feature database 101. The data auditor 434 may analyze the data in feature database 101 for auditing, such as to remove outliers and standardize data.

The ML modeler 116 may train the first level classifier 122 and the second level classifier 124 based on the features 103 and the labels 105, such as described with respect to FIG. 1. The model auditor 440 may evaluate performance of the first level classifier 122 and/or the second level classifier 124. Table 1 below illustrates an example set of data for evaluating the first level classifier 122 and the second level classifier 124. It should be understood that the values below are provided for illustrative purposes. Other values may be used instead or in addition to those listed in Table 1. In Table 1, evaluation data may include transaction data involving "ExampleBank", an issuer 130 for which data, such as transaction data in the country USA relating to accounts 133 is available. The available data may be split into a training set (80% of available data) and a validation set (20% of available data). Different split ratios may be used as well. The Out Of Time (OOT) measurement may use features 103 from one time period (Apr. 1, 2017-Dec. 31, 2018) and labels of data from another time period (Dec. 1, 2018-Jan. 31, 2020). Different time periods for the OOT evaluation may be used as well.

TABLE 1

| Sample Data for Evaluation. | |
|---|---|
| Issuer | ExampleBank |
| Country | USA |
| Train/Validation Timeline (80:20 split) | Features: Jul. 1, 2017-Mar. 31 2018 Labels: Mar. 1, 2018-Apr. 30, 2019 (March data for month 0. January 2019-April 2019 for 120 days gap post month 9, December 2018) |
| Out of Time | Features: Apr. 1, 2017-Dec. 31, 2018 Labels: Dec. 1, 2018-Jan. 31, 2020 |

OOT may refer to a measurement in a regression analysis, using a later dataset than used for original training, that has statistically greater error at a defined risk factor from a regression line or multiple factor regression model than other measurements. Thus, an OOT measurement with respect to a given observation, or feature, may indicate that the observation is not representative of the distribution. In some examples, OOT testing may assess such OOT measurements and may be used to recalibrate modelling, such as by removing the features 103 that are associated with the OOT measurements.

Evaluation of model performance (of the first level classifier 122 and/or the second level classifier 124) may be observed across different countries. Such model evaluation, as illustrated in Table 2, shows that the models may perform well across different countries. Thus, country-specific modeling may be unnecessary. In some examples, this may also mean that data from all countries may be aggregated for training and validation and/or data from one or more select countries may be used for training and validation.

TABLE 2

| Example of Results. | | | | | | | |
|---|---|---|---|---|---|---|---|
| | Overall Churn | 1st Level | 1st Level Capture | Level 2 Precision (labels 0-3) | | | |
| Country | Rate | AUC | Rate | 0 | 1 | 2 | 3 |
| CountryA | 45.3 | 79.7 | 70.2 | 77.9 | 32.5 | 35.4 | 17.4 |
| CountryB | 60.1 | 81.9 | 78.9 | 93.3 | 26.1 | 13.1 | 10.5 |
| CountryC | 64.8 | 78.9 | 79.4 | 69 | 27 | 22.6 | 19.4 |
| CountryD | 62.5 | 78.4 | 77.9 | 95.4 | 18.2 | 12.9 | 12.7 |
| CountryE | 67.7 | 86.2 | 84.9 | 86.4 | 24.8 | 19.6 | 5.9 |
| CountryF | 69.4 | 84.3 | 85.0 | 85.7 | 18.3 | 8.2 | 7.9 |
| CountryG | 49.7 | 83.6 | 76.4 | 75.3 | 19 | 10 | 15.2 |
| CountryH | 39 | 75.6 | 63.6 | 26.8 | 27.5 | 27 | 27 |
| CountryI | 45.4 | 85.7 | 80.1 | 96.2 | 16.5 | 8 | 11.3 |

Figure 10:
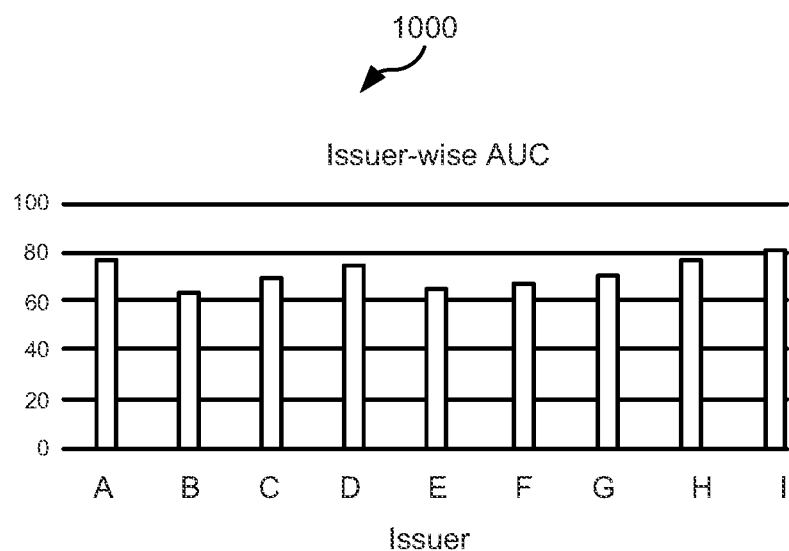
FIG. 10 illustrates an example plot of an Area Under Curve ("AUC") results of the level one classifier.
Figure 11:
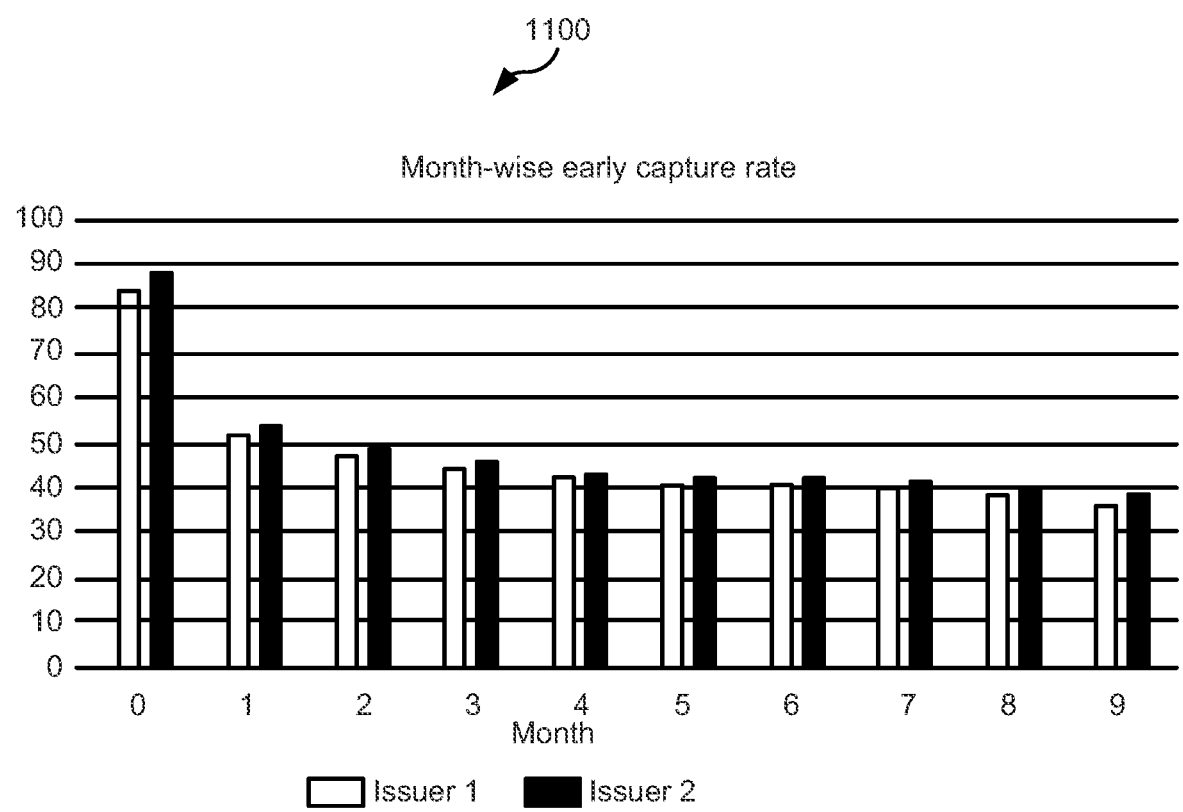
FIG. 11 illustrates an example plot of early capture rate per month reflecting early detection of inactivity.

FIG. 10 illustrates an example plot 1000 of an Area Under Curve ("AUC") results of the level one classifier. Results are shown for results relating to classifications of accounts of issuers A-I. FIG. 11 illustrates an example plot 1100 of month-wise early capture rate per month reflecting early detection of inactivity. Early capture rate may signify how much of the inactive population is able to be captured in advance, months before the inactivity period starts. This is important as it gives an early notification to the issuer so that preventive measures may be taken to avoid inactivity. Such preventive measures may include providing incentives to make transactions, providing reminders to make transactions, providing recommendations relating to activity, and/or other preventive measures that may cause activity on an account 133.

Figure 12:
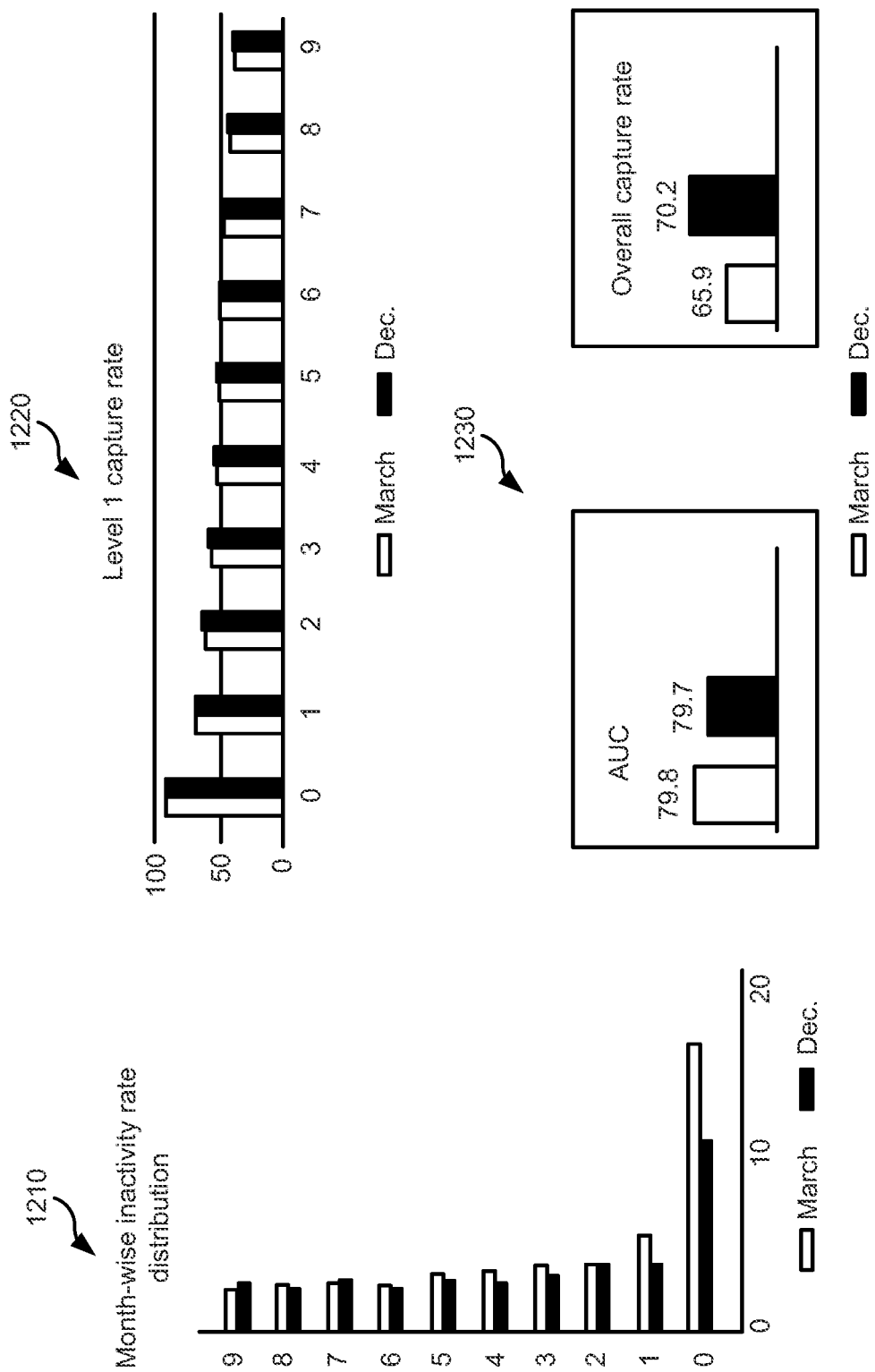
FIG. 12 illustrates an example panel set of results of level one classification.

FIG. 12 illustrates an example panel set of results 1200 of level one classification. Plot 1210 illustrates an example of month-wise inactivity rate distribution across 10 months (months 0-9) with respect to March and December being used as a snapshot date. Month 0 shows the highest inactivity rates at 16.9 and 11.2% respectively for March and December. Inactivity rates for the remaining months were, for March and December respectively, month 1: 3.9 and 3.5; month 2: 3.5 and 3.5; month 3: 3.6 and 3.1; month 4: 3.3 and 2.9; month 5: 3.2 and 3.0; month 6: 2.8 and 2.7; month 7: 2.0 and 3.0; month 8: 2.8 and 2.6; month 9: 2.5 and 2.8. Plot 1220 illustrates an example of level 1 month-wise capture rates across 10 months (months 0-9) with respect to March and December being used as a snapshot date. Plot 1230 shows AUC values and capture rates for March and December.

Figure 13:
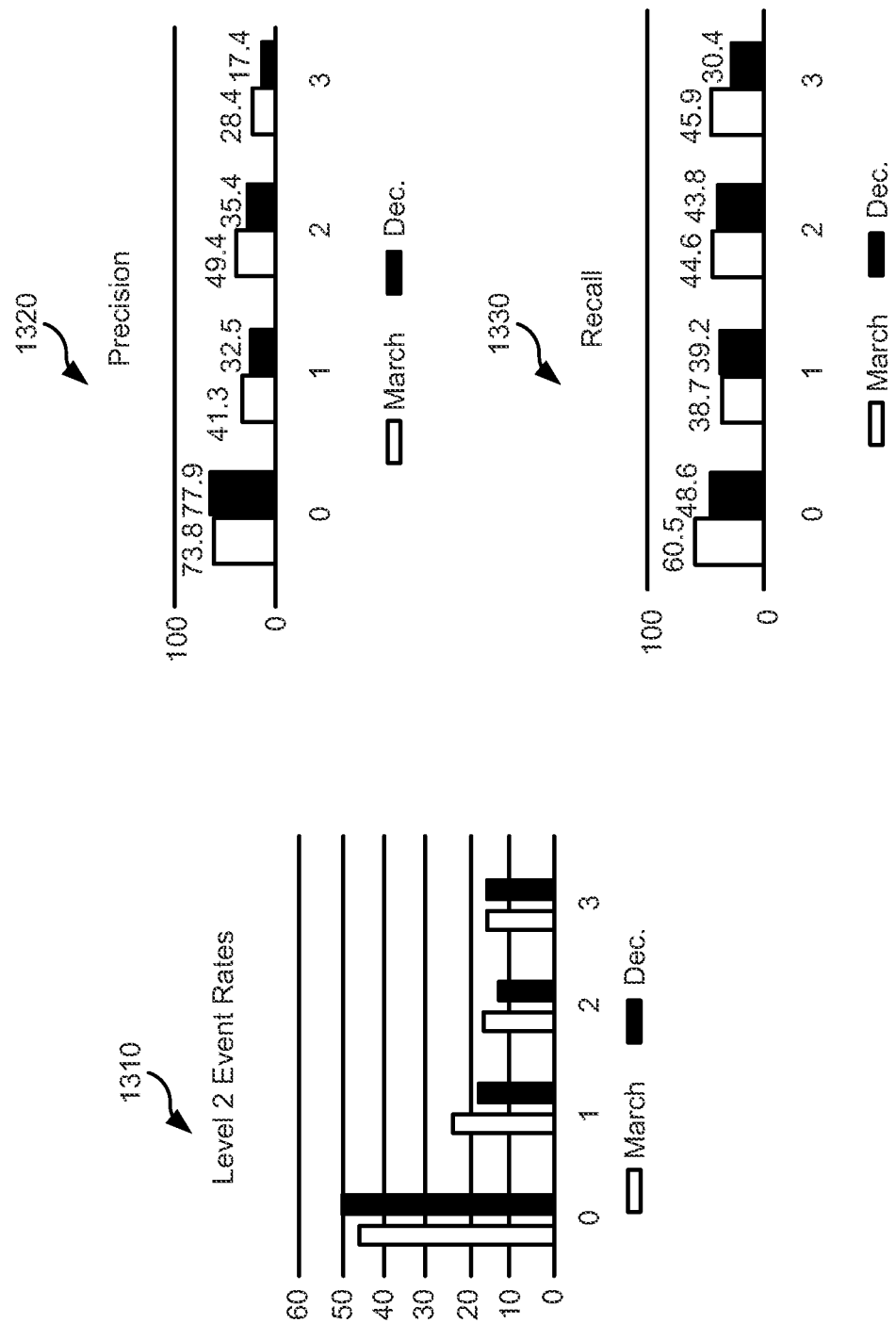
FIG. 13 illustrates an example panel set of results of level two classification.

FIG. 13 illustrates an example panel set of results 1300 of level two classification. In the plots 1310-1330, labels 0, 1, 2, and 3 respectively correspond to month groupings: 0, 1-4, 5-9, and 10. Plot 1310 illustrates example level 2 event rates for labels 0 to 4 with respect to March and December being used as a snapshot date. Plot 1320 illustrates example precision values for labels 0 to 4 with respect to March and December being used as a snapshot date. Plot 1330 illustrates example recall values for labels 0 to 4 with respect to March and December being used as a snapshot date.

Figure 14:
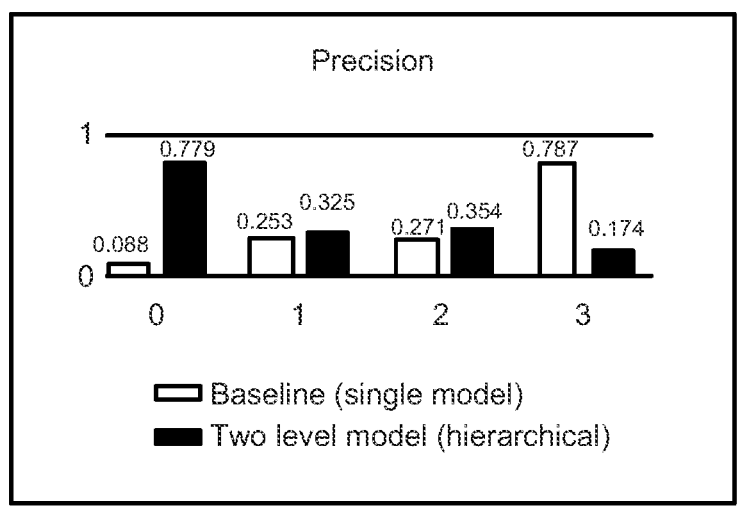
FIG. 14 illustrates an example plot of hierarchical level two classification compared to a single model.

FIG. 14 illustrates an example plot 1400 of precision values of hierarchical level two classification compared to a single model. As illustrated in the example plot 1400, hierarchical level two classification improves the precision of classes 0, 1, and 2 compared to single model classification. The classes illustrated in FIG. 14 may be similar to the classes in FIG. 13 or other figures or examples.

Figure 15:
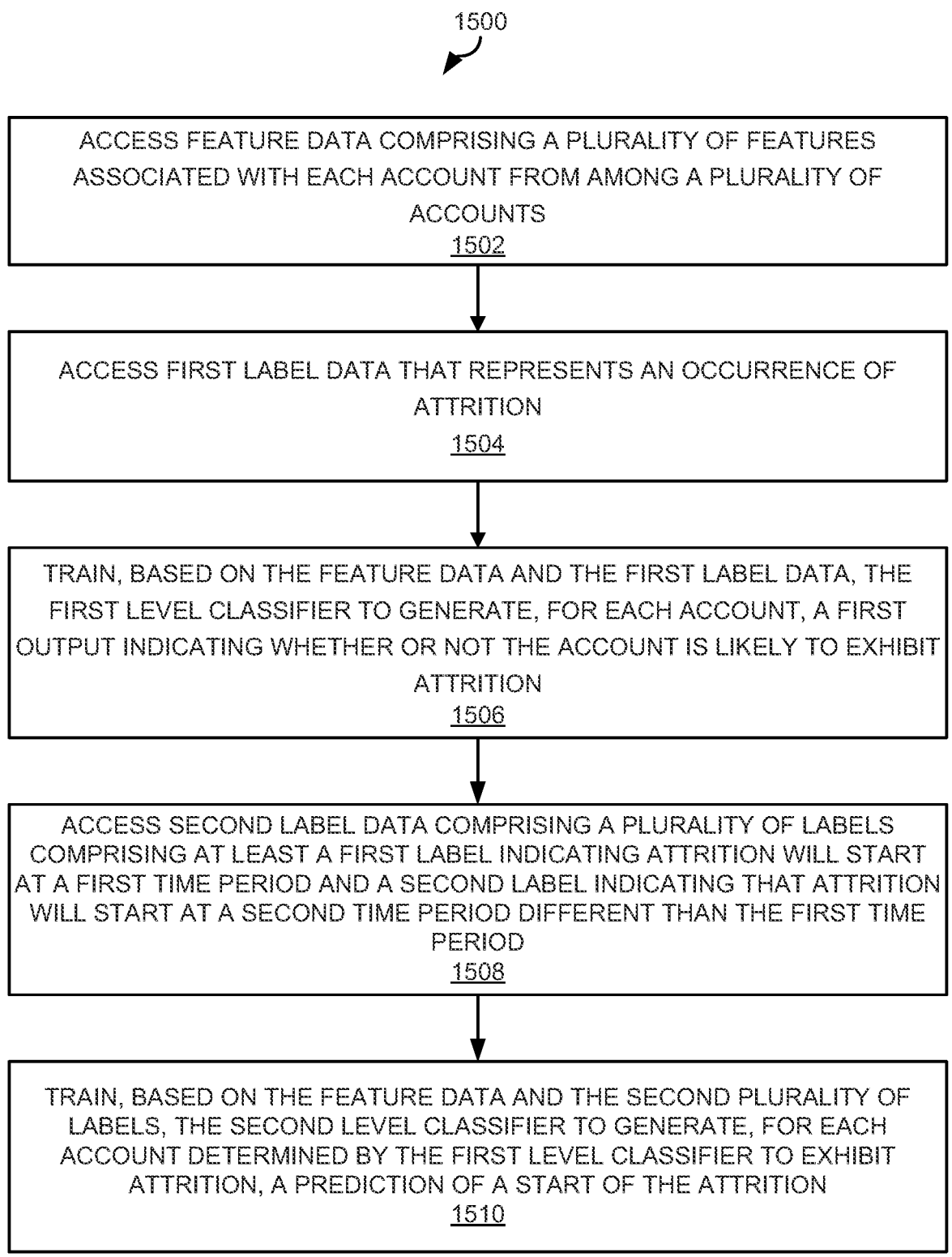
FIG. 15 illustrates an example of a method of training hierarchical models.

FIG. 15 illustrates an example of a method 1500 of training hierarchical models. At 1502, the method 1500 may include accessing feature data comprising a plurality of features (such as features 103) associated with each account (such as account 133) from among a plurality of accounts. At 1504, the method 1500 may include accessing first label data that represents an occurrence of attrition. For example, the first label data may include a label 105 indicating attrition (for binary classification or one-class classification). In some examples, the first label data may include another label 105 indicating no attrition (for binary classification).

At 1506, the method 1500 may include training, based on the feature data and the first label data, the first level classifier (such as first level classifier 122) to generate, for each account, a first output indicating whether or not the account is likely to exhibit attrition. At 1508, the method 1500 may include accessing second label data comprising a plurality of labels comprising at least a first label 105 indicating attrition will start at a first time period and a second label indicating that attrition will start at a second time period different than the first time period. For example, the first label 105 may correspond to a grouping of one or more months and the second label may correspond to another grouping of one or more months.

At 1510, the method 1500 may include training, based on the feature data and the plurality of labels, the second level classifier (such as second level classifier 124) to generate, for each account determined by the first level classifier to exhibit attrition, a prediction of a start of the attrition. For example, the second level classifier may include a multi-class classifier.

Figure 16:
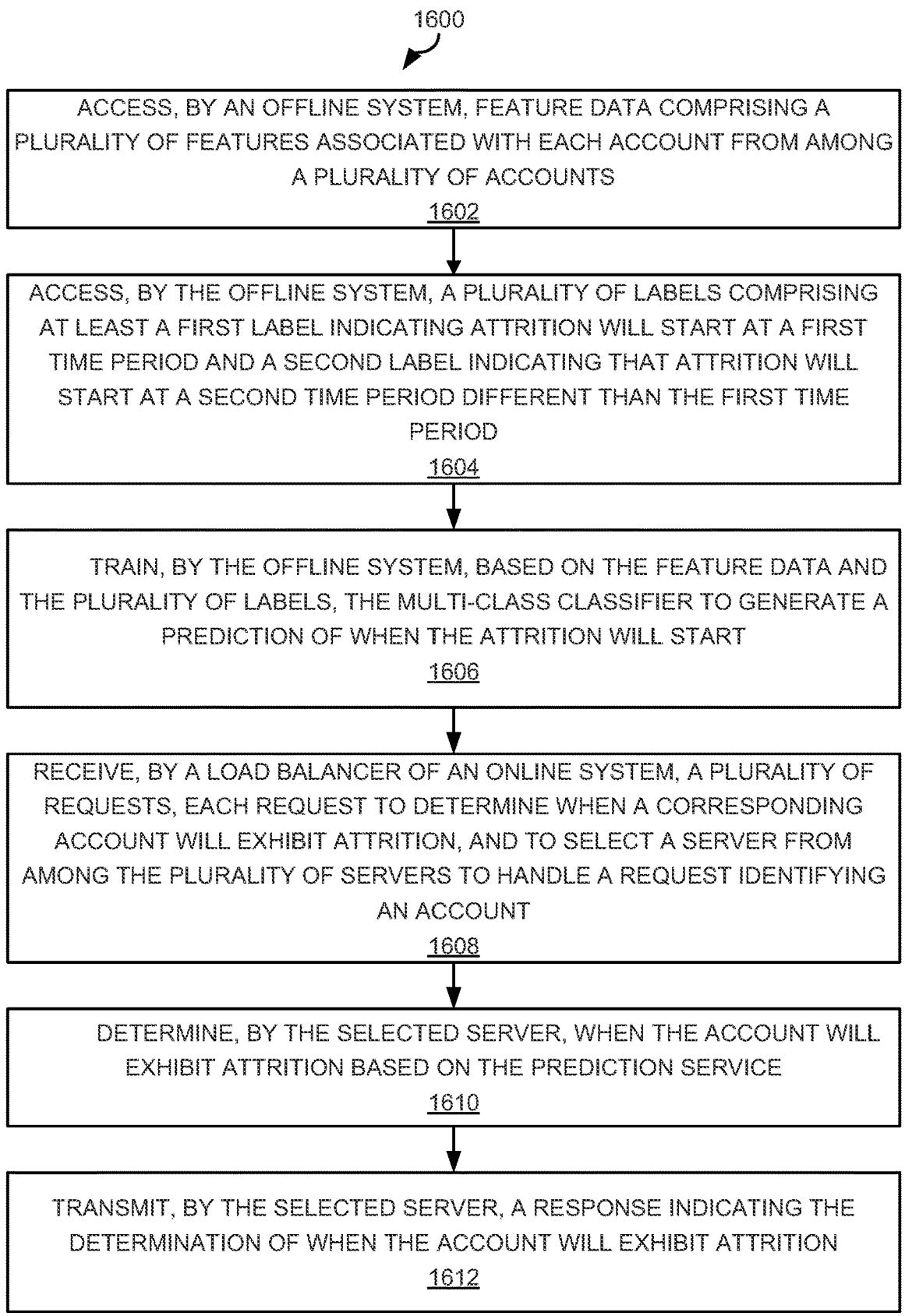
FIG. 16 illustrates an example of a method of training and using the hierarchical models in an offline and online system.

FIG. 16 illustrates an example of a method 1600 of training and using a multi-class classifier (such as the second level classifier 124) in an offline and online system (such as offline system 430 and online system 410). At 1602, the method 1600 may include accessing, by the offline system, feature data comprising a plurality of features (such as features 103) associated with each account from among a plurality of accounts (such as accounts 131). Such feature data may be accessed from the feature database 101.

At 1604, the method 1600 may include accessing, by the offline system, a plurality of labels (such as labels 103) comprising at least a first label indicating attrition will start at a first time period and a second label indicating that attrition will start at a second time period different than the first time period. The labels may be accessed from the feature database 101. The first time period may be defined by a grouping of one or more months or other time periods. Likewise, the second time period may be defined by a second grouping of one or more second months different than the one or more months. At 1606, the method 1600 may include training, by the offline system, based on the feature data and the plurality of labels, a multi-class classifier to generate a prediction of a start of the attrition. For example, the prediction of the start of the attrition may indicate that the attrition will start at a particular month in a prediction period.

At 1608, the method 1600 may include receiving, by a load balancer of an online system, a plurality of requests, each request to determine when a corresponding account (such as an account 133) will exhibit attrition, and selecting a server (such as a server 414) from among the plurality of servers to handle a request identifying an account. At 1610, the method 1600 may include determining, by the selected server of the online system, when the account will exhibit attrition based on a prediction service (such as prediction service 416) implemented by the plurality of servers. At 1612, the method 1600 may include transmitting, by the selected server, a response indicating the determination of when the account will exhibit attrition.

Figure 17:
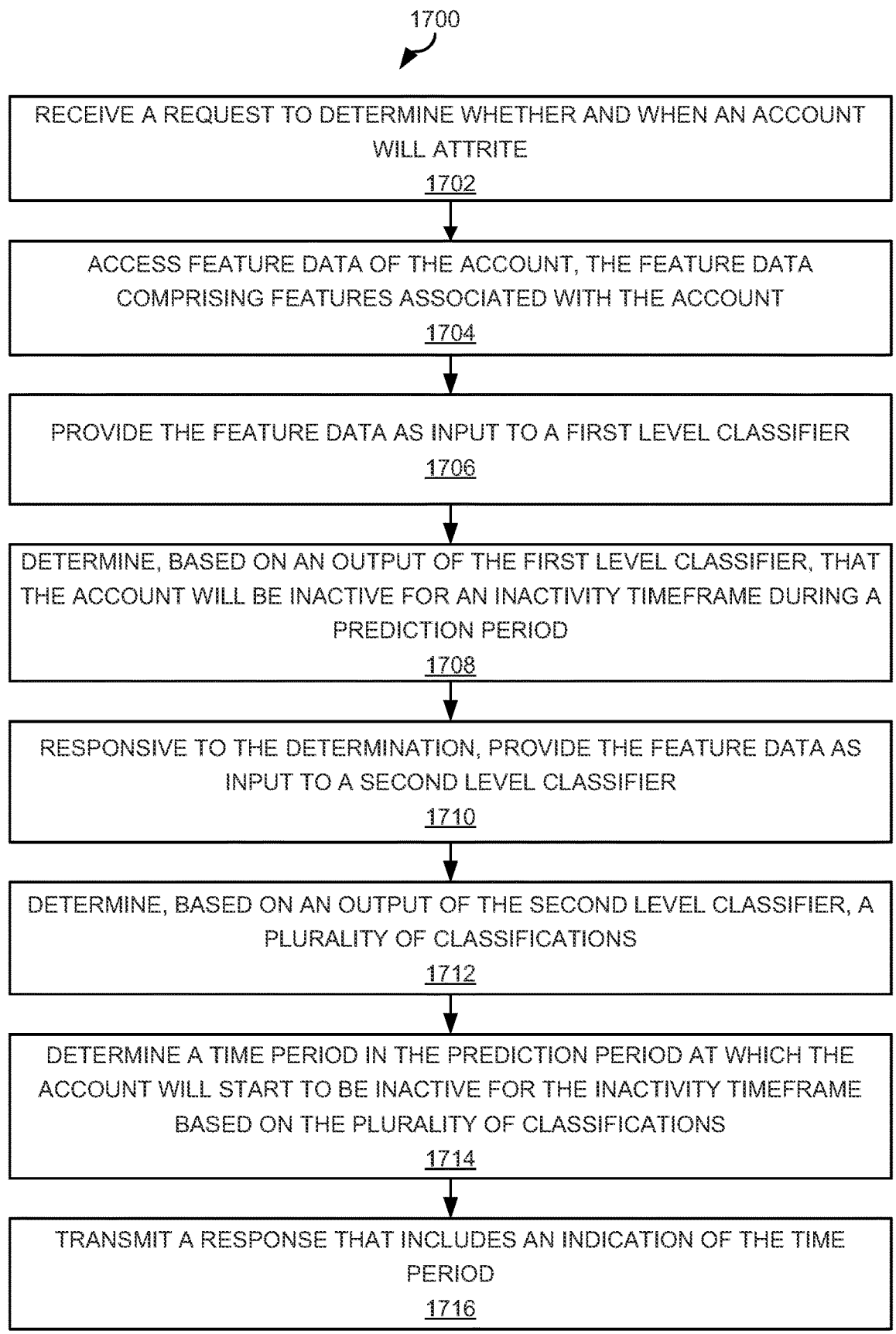
FIG. 17 illustrates an example of a method of determining a start of attrition based on hierarchical models.

FIG. 17 illustrates an example of a method 1700 of determining a start of attrition based on hierarchical models. At 1702, the method 1700 may include receiving a request to determine whether and when an account (such as account 133) will attrite. At 1704, the method 1700 may include accessing feature data of the account, the feature data comprising features (such as features 103) associated with the account. At 1706, the method 1700 may include provide the feature data as input to a first level classifier (such as first level classifier 122). At 1708, the method 1700 may include determine, based on an output of the first level classifier, that the account will be inactive for an inactivity timeframe (such as inactivity timeframe 204) during a prediction period (such as prediction period 206).

At 1710, the method 1700 may include responsive to the determination that the account will be inactive for the inactivity timeframe during the prediction period, providing the feature data as input to a second level classifier (such as second level classifier 124). At 1712, the method 1700 may include determining, based on an output of the second level classifier, a plurality of classifications, each classification representing a probability that the account will be inactive for the inactivity timeframe starting at a particular time period during the prediction period. The plurality of classifications may each corresponding to a respective label 105.

At 1714, the method 1700 may include determining a time period in the prediction period at which the account will start to be inactive for the inactivity timeframe based on the plurality of classifications. The time period may include a grouping of one or more months or other time period grouping corresponding to a label 105. At 1716, the method 1700 may include transmitting a response that includes an indication of the time period.

Figure 18:
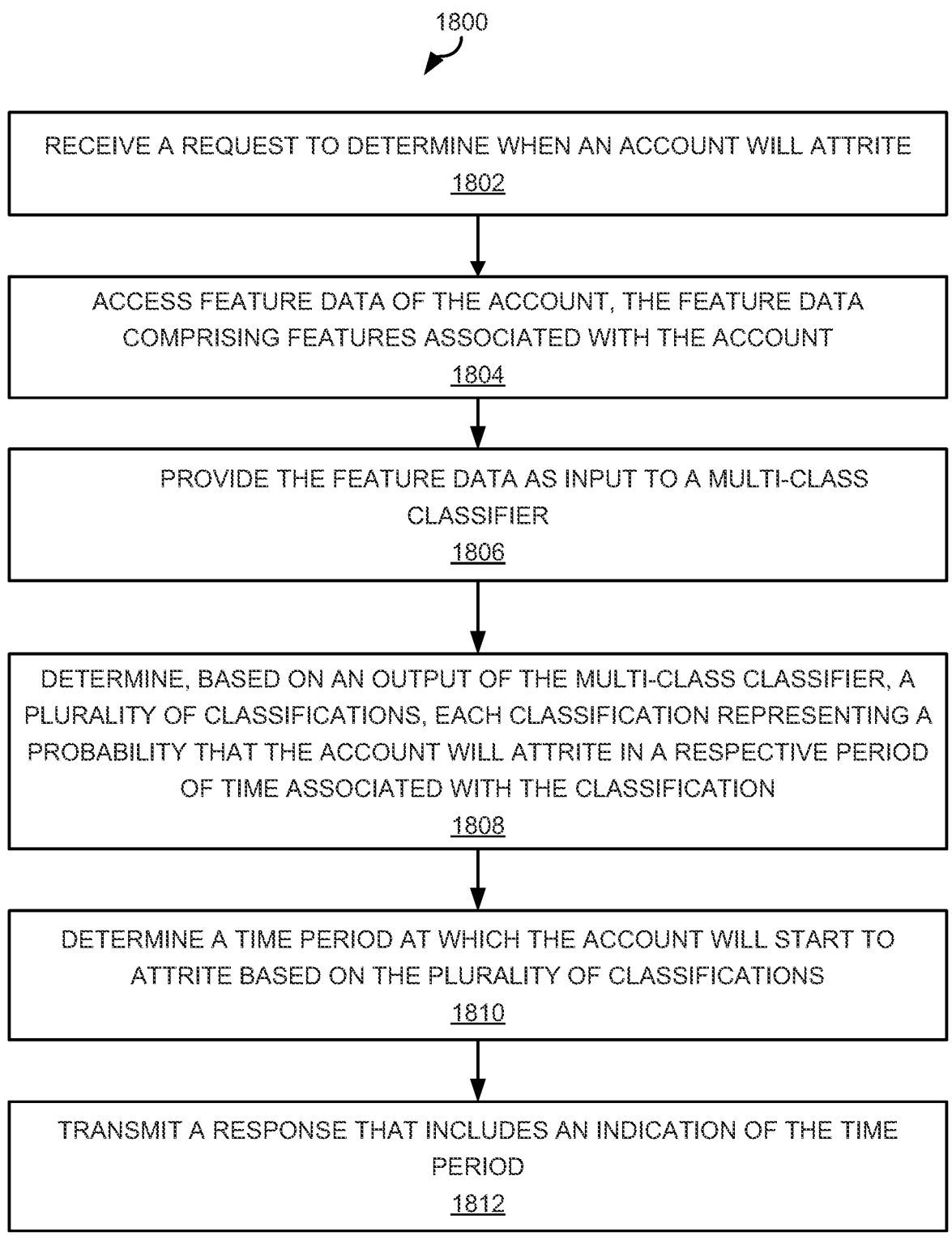
FIG. 18 illustrates an example of a method of determining a start of attrition based on a multi-class classifier.

FIG. 18 illustrates an example of a method 1800 of determining a start of attrition based on a multi-class classifier. At 1802, the method 1800 may include receive a request to determine when an account (such as an account 133) will attrite. At 1804, the method 1800 may include access feature data of the account, the feature data comprising features (such as features 103) associated with the account. At 1806, the method 1800 may include providing the feature data as input to a multi-class classifier (such as second level classifier 124). At 1808, the method 1800 may include determining, based on an output of the multi-class classifier, a plurality of classifications, each classification representing a probability that the account will attrite in a respective time period associated with the classification. At 1810, the method 1800 may include determining a time period at which the account will start to attrite based on the plurality of classifications. At 1812, the method 1800 may include transmitting a response that includes an indication of the time period.

Figure 19:
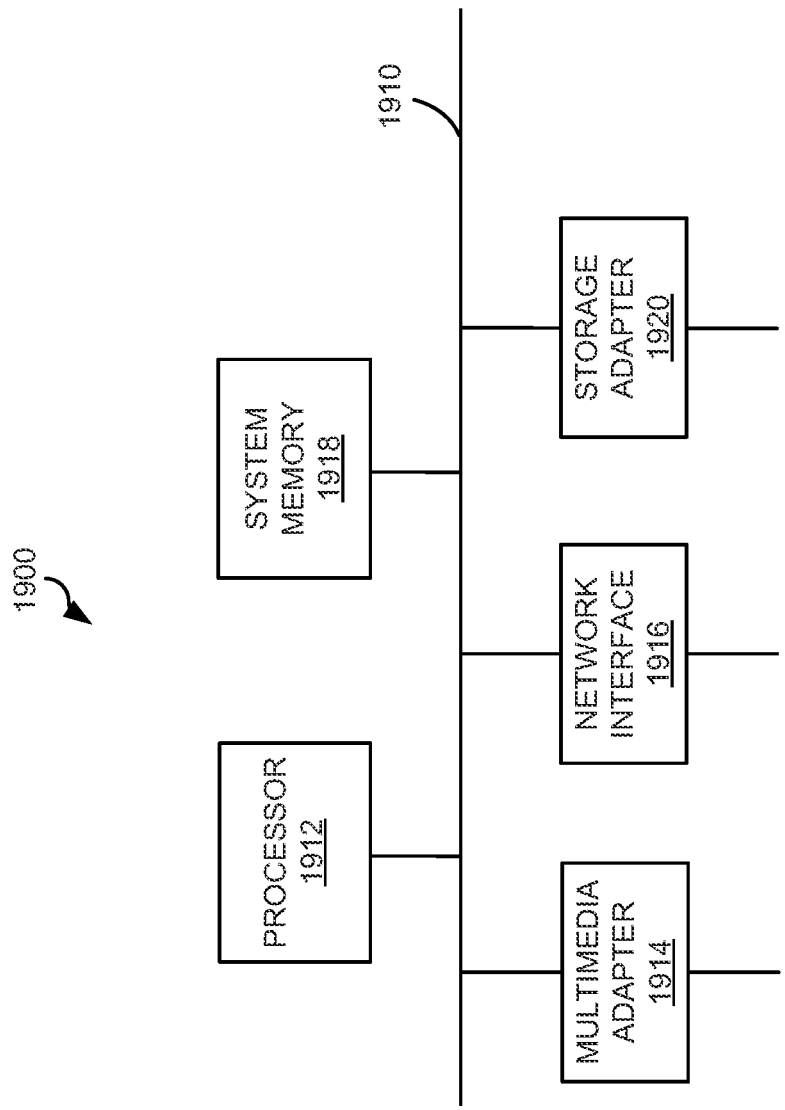
FIG. 19 illustrates an example of a computer system that may be implemented by devices illustrated in FIGS. 1, 3, and 4.

FIG. 19 illustrates an example of a computer system 1900 that may be implemented by devices (such as the attrition prediction system 110, device of issuer 130, load balancer 412, server 414, a server of a payment network 160 and/or other components) illustrated in FIGS. 1, 3, and 4. The computer system 1900 may be part of or include the system 100 to perform the functions and features described herein. For example, various ones of the devices of system 100 may be implemented based on some or all of the computer system 1900.

The computer system 1900 may include, among other things, an interconnect 1910, a processor 1912, a multimedia adapter 1914, a network interface 1916, a system memory 1918, and a storage adapter 1920.

The interconnect 1910 may interconnect various subsystems, elements, and/or components of the computer system 1900. As shown, the interconnect 1910 may be an abstraction that may represent any one or more separate physical buses, point-to-point connections, or both, connected by appropriate bridges, adapters, or controllers. In some examples, the interconnect 1910 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1384 bus, or "firewire," or other similar interconnection element.

In some examples, the interconnect 1910 may allow data communication between the processor 1912 and system memory 1918, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 1912 may control operations of the computer system 1900. In some examples, the processor 1912 may do so by executing instructions such as software or firmware stored in system memory 1918 or other data via the storage adapter 1920. In some examples, the processor 1912 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 1914 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 1916 may provide the computer system 1900 with an ability to communicate with a variety of remove devices over a network such as the communication network 107 illustrated in FIG. 1. The network interface 1916 may include, for example, an Ethernet adapter, a Fibre Channel adapter, and/or other wired- or wireless-enabled adapter. The network interface 1916 may provide a direct or indirect connection from one network element to another, and facilitate communication and between various network elements.

The storage adapter 1920 may connect to a standard computer readable medium for storage and/or retrieval of information, such as a fixed disk drive (internal or external).

Other devices, components, elements, or subsystems (not illustrated) may be connected in a similar manner to the interconnect 1910 or via a network such as the communication network 107. The devices and subsystems can be interconnected in different ways from that shown in FIG. 11. Instructions to implement various examples and implementations described herein may be stored in computer-readable storage media such as one or more of system memory 1918 or other storage. Instructions to implement the present disclosure may also be received via one or more interfaces and stored in memory. The operating system provided on computer system 1900 may be MS-DOS®, MS-WINDOWS®, OS/2®, OS X®, IOS®, ANDROID®, UNIX®, Linux®, or another operating system.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number.

The term "first level classifier" may be used interchangeably throughout as "level 1 classifier," "level one classifier," "level 1" or similar terms. Likewise, the term "second level classifier" may be used interchangeably throughout as "level 2 classifier," "level two classifier," "level 2" or similar terms. Furthermore, examples that follow may describe classifying an account. Such classification may also refer to classifying a card associated with the account. Similarly, account attrition will be described, but this may also refer to a card attrition for a card associated with the account.

The features database 101 and/or other databases described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIGS. 1, 3, and 4.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of account inactivity modeling through hierarchical data models including a first level classifier and a second level classifier, comprising:
a processor programmed to:
access feature data comprising a plurality of features associated with each account from among a plurality of accounts;
access first label data that represents an occurrence of attrition;
train, based on the feature data and the first label data, the first level classifier to generate, for each account, a first output indicating whether or not the account is likely to exhibit attrition;
access second label data comprising a plurality of labels comprising at least a first label indicating attrition will start at a first time period and a second label indicating that attrition will start at a second time period different than the first time period;
train, based on the feature data and the plurality of labels, the second level classifier to generate, for each account determined by the first level classifier to exhibit attrition, a prediction of a start of the attrition;
generate one or more evaluation metrics that indicate performance of the first level classifier and/or the second level classifier trained on the feature data;
identify a subset of features from the feature data based on the one or more evaluation metrics to improve model performance and/or reduce the amount of data processed by the first level classifier and/or the second level classifier; and
re-train the first level classifier and/or the second level classifier based on the identified subset of features.

2. The system of claim 1, wherein the second level classifier comprises a multi-class classifier, and wherein to train the second level classifier, the processor is further programmed to:
generate, for each account determined by the first level classifier to exhibit attrition, a plurality of classifications, each classification for each account indicating a respective probability that the account will exhibit attrition in a respective time period, wherein the start of the attrition is selected based on the plurality of classifications.

3. The system of claim 1, wherein the first level classifier comprises a binary classifier trained to classify each account into a first class indicating attrition and a second class indication no attrition, and wherein the first label data comprises a first binary label indicating attrition and a second binary label indicating no attrition.

4. The system of claim 1, wherein the first level classifier is trained to predict attrition based on an inactivity timeframe during which an account is inactive after a snapshot date over a prediction period.

5. The system of claim 1, wherein the feature data comprises a subset of available features that were subjected to feature reduction based on an evaluation of the first level classifier and/or the second level classifier.

6. The system of claim 1, wherein the second label data represents a grouping of time periods selected based on an evaluation of the first level classifier and/or the second level classifier.

7. The system of claim 1, wherein the first label comprises a first number of months and the second label comprises a second number of months different than the first number of months.

8. The system of claim 1, wherein the system comprises an offline system in which the first level classifier and the second level classifier are trained and validated and an online system comprising a prediction service that receives requests to classify accounts based on the first level classifier and the second level classifier.

9. The system of claim 8, wherein the attrition relates to inactivity of payment accounts, and wherein the processor is further programmed to:
determine, based on the first level classifier, that a payment account will exhibit attrition;
determine, based on the second level classifier, the start of the attrition; and
transmit an indication of the start of the attrition an issuer of the payment account.

10. The system of claim 9, wherein the second level classifier comprises a multi-class classifier, and wherein to determine the start of the attrition, the processor is further programmed to:
generate a plurality of classifications for the payment account, each classification indicating a respective probability that the payment account will exhibit attrition in a respective time period, wherein the determination of the start of the attrition is based on the plurality of classifications.

11. A method of account inactivity modeling through hierarchical data models including a first level classifier and a second level classifier, comprising:

accessing, by a processor, feature data comprising a plurality of features associated with each account from among a plurality of accounts;

accessing, by the processor, first label data that represents an occurrence of attrition;

training, by the processor, based on the feature data and the first label data, the first level classifier to generate, for each account, a first output indicating whether or not the account is likely to exhibit attrition;

accessing, by the processor, second label data comprising a plurality of labels comprising at least a first label indicating attrition will start at a first time period and a second label indicating that attrition will start at a second time period different than the first time period; and training, by the processor, based on the feature data and the plurality of labels, the second level classifier to generate, for each account determined by the first level classifier to exhibit attrition, a prediction of a start of the attrition;

generating, by the processor, one or more evaluation metrics that indicate performance of the first level classifier and/or the second level classifier trained on the feature data;

identify, by the processor, a subset of features from the feature data based on the one or more evaluation metrics to improve model performance and/or reduce the amount of data processed by the first level classifier and/or the second level classifier; and re-train, by the processor, the first level classifier and/or the second level classifier based on the identified subset of features.

12. The method of claim 11, wherein the second level classifier comprises a multi- class classifier, and wherein training the second level classifier comprises:

generating, for each account determined by the first level classifier to exhibit attrition, a plurality of classifications, each classification for each account indicating a respective probability that the account will exhibit attrition in a respective time period, wherein the start of the attrition is selected based on the plurality of classifications.

13. The method of claim 11, wherein training the second level classifier comprises:

accessing the feature data and the second label data for training via Gradient Boosting Machines.

14. The method of claim 11, wherein the attrition relates to inactivity of payment accounts, and wherein the method further comprises:

determining, based on the first level classifier, that a payment account will exhibit attrition;

determining, based on the second level classifier, the start of the attrition; and transmitting an indication of the start of the attrition to an issuer of the payment account.

15. The method of claim 14, wherein the second level classifier comprises a multi- class classifier, and wherein determining the start of the attrition comprises:

generating a plurality of classifications for the payment account, each classification indicating a respective probability that the payment account will exhibit attrition in a respective time period, wherein the determination of the start of the attrition is based on the plurality of classifications.

16. A system of predicting attrition, comprising:

a processor programmed to:

receive a request to determine when an account will attrite;

access feature data of the account, the feature data comprising features associated with the account;

provide the feature data as input to a multi-class classifier;

determine, based on an output of the multi-class classifier, a plurality of classifications, each classification representing a probability that the account will attrite in a respective time period time associated with the classification;

determine a time period at which the account will start to attrite based on the plurality of classifications; and transmit a response that includes an indication of the time period;

generate one or more evaluation metrics that indicate performance of the multi-class classifier;

identify a subset of features from the feature data based on the one or more evaluation metrics to improve model performance and/or reduce the amount of data processed by the multi- class classifier; and re-train the multi-class classifier based on the identified subset of features.

17. The system of claim 16, wherein the processor is further programmed to:

access first label data that represents an occurrence of attrition;

train, based on the feature data and the first label data, a first level classifier to generate, for the account, a first output indicating whether or not the account is likely to exhibit attrition;

access second label data comprising a plurality of labels comprising at least a first label indicating attrition will start at a first time period and a second label indicating that attrition will start at a second time period different than the first time period; and train, based on the feature data and the plurality of labels, the second level classifier to generate, for the account determined by the first level classifier to exhibit attrition, a prediction of a start of the attrition.

18. The system of claim 17, wherein the processor is further programmed to:

generate, for the account determined by the first level classifier to exhibit attrition, a plurality of classifications, each classification indicating a respective probability that the account will exhibit attrition in a respective time period, wherein the start of the attrition is selected based on the plurality of classifications.

19. The system of claim 17, wherein the first level classifier comprises a binary classifier trained to classify the account into a first class indicating attrition and a second class indication no attrition, and wherein the first label data comprises a first binary label indicating attrition and a second binary label indicating no attrition.

20. The system of claim 17, wherein the feature data comprises a subset of available features that were subjected to feature reduction based on an evaluation of the first level classifier and/or the second level classifier.

* * * * *